United States Patent [19]
Baxter

[11] Patent Number: 5,876,598
[45] Date of Patent: *Mar. 2, 1999

[54] WATER PURIFICATION DECANT ASSEMBLY

[75] Inventor: Thomas D. Baxter, Greenville, Miss.

[73] Assignee: Environmental Treatment Facility, Inc., Greenville, Miss.

[ * ] Notice: This patent issued on a continued prosecution application filed under 37 CFR 1.53(d), and is subject to the twenty year patent term provisions of 35 U.S.C. 154(a)(2).

[21] Appl. No.: 843,440

[22] Filed: Apr. 16, 1997

[51] Int. Cl.$^6$ ..................................................... B01D 21/02
[52] U.S. Cl. ........................ 210/205; 210/207; 210/248; 210/258; 210/525; 210/532.1; 210/534; 417/360
[58] Field of Search ..................................... 210/205, 206, 210/207, 248, 258, 523, 525, 532.1, 534; 417/360, 423.3

[56] References Cited

U.S. PATENT DOCUMENTS

| | | | |
|---|---|---|---|
| 4,345,996 | 8/1982 | Lindman et al. | 210/206 |
| 4,476,923 | 10/1984 | Walling | 417/404 |
| 4,614,458 | 9/1986 | Austin | 210/170 |
| 4,724,073 | 2/1988 | Calltharp et al. | 210/525 |
| 4,865,751 | 9/1989 | Smisson | 210/532.1 |
| 4,963,252 | 10/1990 | Desjardins | 210/172 |
| 5,035,795 | 7/1991 | Schmid | 210/532.1 |
| 5,186,610 | 2/1993 | Pennington et al. | |
| 5,341,523 | 8/1994 | Barnes | 210/163 |
| 5,358,644 | 10/1994 | Dennis | |
| 5,456,829 | 10/1995 | Brown | 210/206 |

*Primary Examiner*—Jay H. Woo
*Assistant Examiner*—Betsey J. Morrison
*Attorney, Agent, or Firm*—Donald C. Casey, Esq

[57] ABSTRACT

An improved modular system of solids separation is described. In the invention, a settling tank is provided which consists of one or more hoppers having sloped sides downwardly to a drain. Liquids with entrained solids are permitted to accumulate within the hopper as the solids settle until the settling has been completed; whereupon a pump lowered into the liquid is used to decant the liquid. The pump is suspended from a flexible conduit and is lowered as the liquid level lowers so that it remains submerged until the pump reaches a predetermined level above the level of the suspended solids. The sludge is removed from the hopper by gravity flow by opening a drain valve in the bottom therein and an anti-vortexing cap is provided over the drain. The cap has sides which conform to the hopper vessels but slope in the opposite direction so that the lower edge of the cap side is a predetermined distance from the hopper side adjacent the drain.

15 Claims, 7 Drawing Sheets

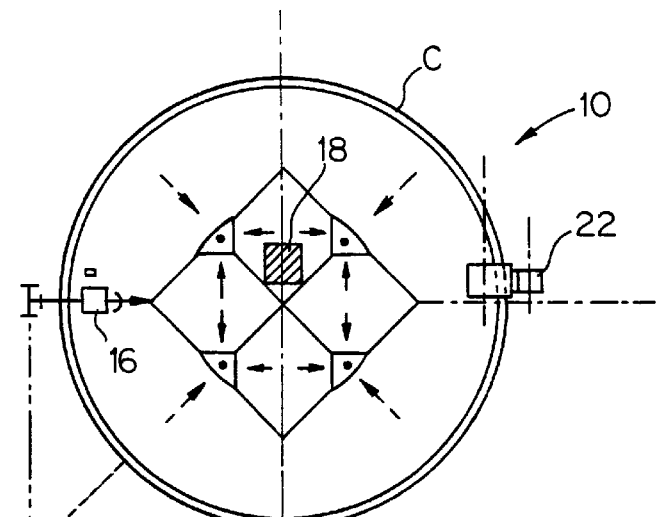
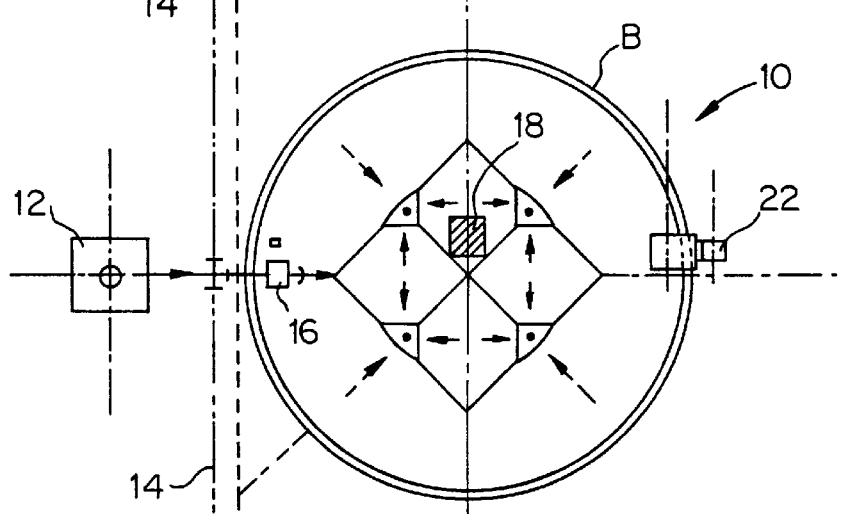
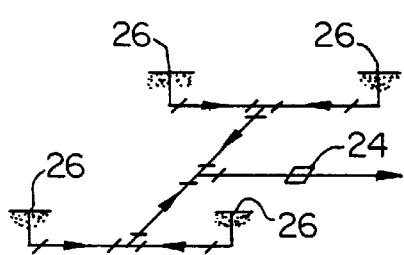
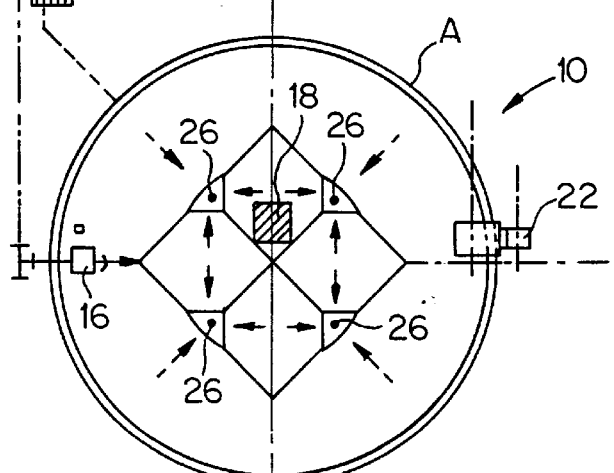
Figure 1
Figure 2

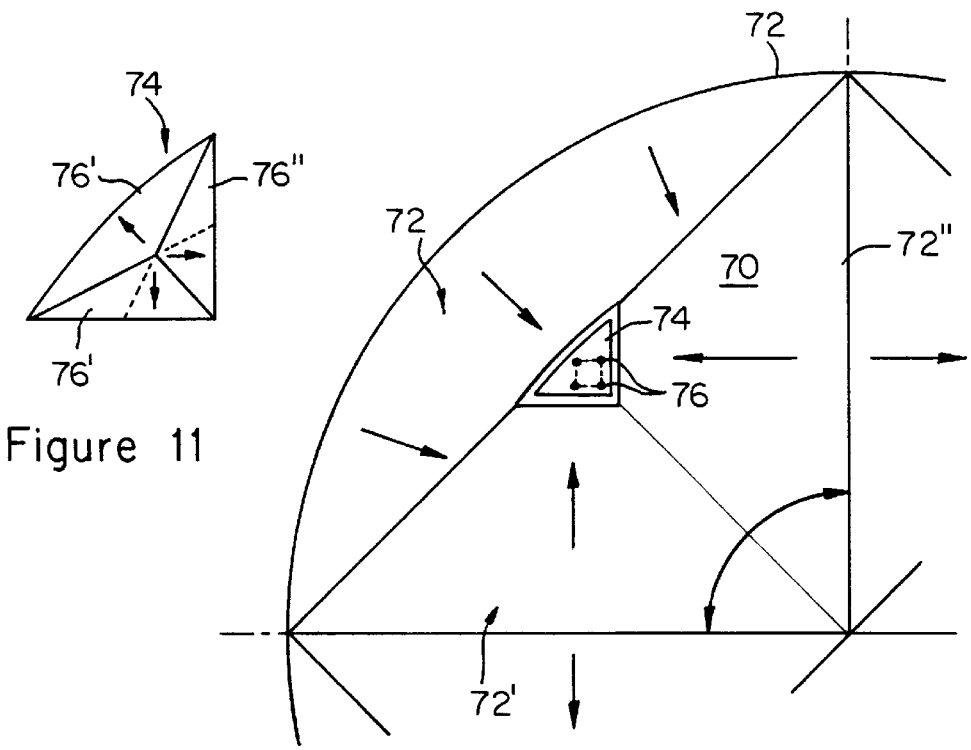
Figure 11
Figure 10
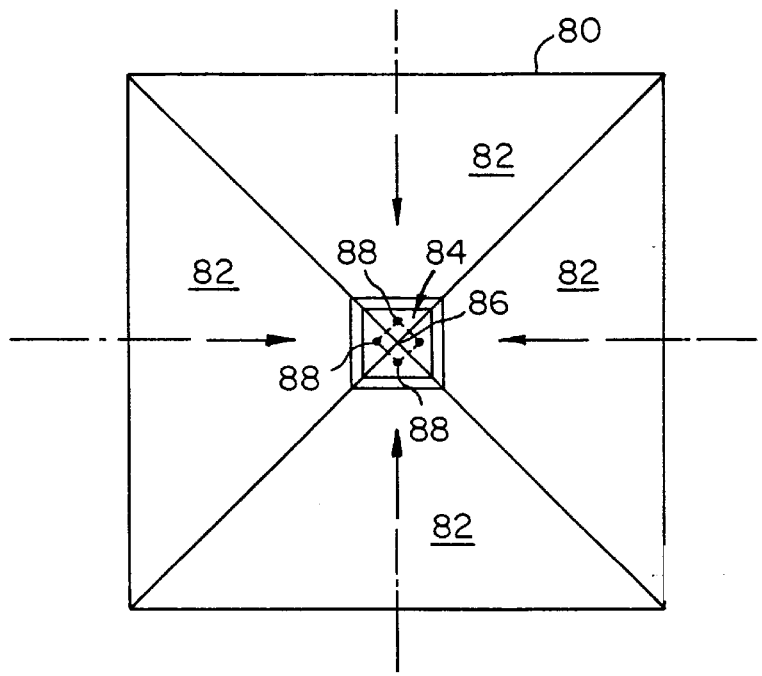
Figure 12

WATER PURIFICATION DECANT ASSEMBLY

CROSS-REFERENCE TO RELATED APPLICATION

This application is related to patent application Ser. No. 08/612,332, Filed Mar. 7, 1996, now U.S. Pat. No. 5,688,400, and entitled Waste Water Treatment Plant. The disclosure of this related application is hereby incorporated by reference.

FIELD OF THE INVENTION

This invention relates to the effluent from a water treatment plant, which is the finished product. This invention relates to a unique apparatus for use in a sequential batch treatment to separate the liquid from the solids therein, so that one of the constituents is suitable for use (drinking water) and the other constituent is suitable for disposal (solids).

This invention relates to the effluent from a waste water treatment plant, which is the finished product. This invention relates to a unique apparatus for use in a sequential batch treatment to separate the liquid from the solids therein, so that one of the constituents is suitable for use (irrigation) and the other constituent is suitable for disposal (solids).

BACKGROUND OF THE INVENTION

The effluent from a waste water treatment plant contains suspended solids and may, in most instances, be regarded as a colloidal suspension of such solids. This effluent, unless treated to an 85% removal of said suspended solids by other treatment means, is not suitable for release into the environment, as a minimum condition. Depending on the receiving stream, the percentage of treatment required could go as high as 95% removal of suspended solids.

When treating the effluent from a waste water treatment plant using chemical additives to coagulate and flocculate said suspended and dissolved solids, and in conjunction with the unique apparatus for use in a sequential batch treatment to separate the solids and liquid, 100% of the solids can be removed from the effluent of a waste water treatment plant.

When water treatment consists of the sterilization only, such as with the use of disinfectant, chlorine, and the liquid contains no suspended or dissolved solids, a continuous treatment process is most effective.

However, when the water has dissolved impurities which will precipitate and/or colloidal solids in suspension, a continuous method of treatment is not cost effective. In such a situation, if an additive or coagulating or flocculating agent is necessary, the cost of treatment can increase as much as five times.

The increased cost in this situation is related to the requirement for additional phases of treatment. Such additions are (a) chemicals, (b) chemical feeders, (c) mixers to coagulate or flocculate, (d) settling chambers and (e) filters. As noted above, the continuous treatment in such a situation is not cost effective.

In the treatment of water using additives on a continuous basis, the coagulated floc created by the additives that settle, when slightly disturbed, will go back into suspension.

In the prior art this condition makes it necessary to use very large settling chambers (item "d" above), which are only 90% effective at best. Therefore, large gravity sand filters (item "c" above) must be used to remove the 10% that escaped from the settling chambers.

Both the settling chamber and the gravity filters require a great deal of space and are very expensive. In addition to the initial cost, the gravity filters use 20% of the already treated water to backwash the filters.

The cost effective means for treating such volumes of water then is by a batch process, using the same chamber for coagulating, flocculating, and settling, whereby the solids settle to the bottom of the chamber for removal and the liquid is decanted from the top.

It is essential in such a settling chamber that the clear water is decanted from the top of the chamber without disturbing the settled solids therebelow and that the settled solids be removed from the chamber when they reach a desired level, quickly and efficiently, with a minimal use of clear treated water escaping with the solids being removed.

As will be subsequently explained then in a water purification system wherein solids are to be removed, a modular plant using sequential batch processing can be much more efficient than continuous processing and the large settling tanks normally associated with water purification can be eliminated. Combining the adding of chemical to coagulate, flocculate, and settling in a single tank, however, requires both an efficient and a non-invasive means for removing the treated liquid without disturbing the settled solids, and for removing the settled solids without using undue quantities of the already treated clear water, so that once such a combination tank has processed one batch, it can be cleared for re-use.

Decanting on a continuous treatment process served no useful purpose that can not be better solved using a properly designed baffled tank and a properly designed over-flow weir. Decanting in a continuous treatment process is employed to increase the density of the settled sludge and lower the moisture content before solid disposal, such as in digesters. The decanted liquid is returned to the head of the treatment plant for re-treatment, since it still contains a large amount of suspended solids.

Concerning decantation of treated liquid, a variety of float pumps are known in the prior art (see for example U.S. Pat. No. 5,186,610). Such pumps are designed to float on a surface, such as a pond or lagoon, so that as liquid is pumped out, the pump itself will descend within the confines of the large area. These devices, however, are not structurally sufficiently durable and controllable with the confines of a small vessel used in sequential batch treatment of large quantities of water. The treatment process which requires additives to coagulate and flocculate, and there must be no obstructions below the surface where settling solid can cling and accumulate.

In addition to U.S. Pat. No. 5,358,644, a skimmer or decant mechanism is provided using a ridged pipe with flexible couplings at each end. The pipe extends downwardly and projects from the center of the vessel to the outer walls, and through the wall of the tank, so that when the valve at the lower end of the pipe is opened, liquid will flow by gravity from the decant downwardly through the pipe. The decanter then rides downwardly with the level of liquid to a predetermined depth. The obstruction below the surface creates an unwanted condition where settling solids can cling and accumulate. This also has the undesirable feature of requiring a pipe which extends downwardly through the tank on which the decanter rides.

U.S. Pat. No. 3,447,688 describes an adjustable tubular skimmer in a fixed location. The range of the adjustment is the diameter of the tube. It is intended for use in a continuous flow sewage plant, and therefore, is not pertinent to a sequential batch water treatment plant, wherein the separate phases of adding chemicals to effect coagulation, flocculation and settling are combined in a single vessel.

SUMMARY OF THE INVENTION

It has been discovered, however, that the effluent from a waste water treatment plant can be efficiently operated in modular form using a sequential batch process wherein each module combines the steps of adding chemicals, mixing chemicals to effect coagulation, flocculation and settling in a single vessel. In this way then the settling tanks and gravity filters can be eliminated and construction can be facilitated. By constructing a plant in modules, capacity can be added as needed rather than as projected over the useful life of the plant. For example, the capacity constructed is based upon that anticipated over the useful life of the plant which would be many years in the future.

In order to facilitate modular units, however, it has been discovered that after the step of settling occurs, the liquid effluent separated from the solids can be rapidly and efficiently decanted away without disturbing the settled solids by using a submersible pump according to this invention which is disposed upon a motor driven conduit. In this way then the motor is timed to drive the pump and reel out a support conduit. The pump is disposed less than 1" below the surface of the treated liquid and as the pump pumps away the treated liquid through a conduit, a motor driven reel coupled to the conduit lowers the pump into the settling tank until the pump reaches a predetermined low point whereupon the motor stops and reverses. The pump is then raised out of the tank, and in this fashion the liquid separated from the settled solids is decanted rapidly and efficiently without disturbing the solids.

In order to efficiently expel the settled solids from the tank, it has been discovered that the most efficient gravity feed for a drain is to locate the drain at the bottom of a flared hopper. By using multiple hoppers in a cluster an economy of scale can be achieved so long as the hoppers all discharge at the same rate. This is necessary in order to avoid disturbing the solids.

Furthermore, it has been discovered that gravity discharge from such hoppers can be greatly facilitated by using an anti-vortex cap over the outlet port. The undesirable vortexing of the sludge or settled solids results in vertical movement thereof with very little horizontal movement. The result is that large quantities of already treated water must be used in order to clear the solids from the hopper. Use of large amounts of already treated water, however, defeats the overall efficiency of the module. The anti-vortex cap of this invention has sides which mirror the sides of the hopper itself in slope and in configuration. The cap itself then opens downwardly into the drain and is supported thereon. It has been discovered that this vortex cap facilitates gravity discharge without the formation of the undesirable vortex described.

Accordingly, it is an object of this invention to provide improvements to vessel construction wherein water treatment can be achieved in a modular vessel and the treated liquid rapidly and efficiently separated from the settled solids.

It is another object of this invention to provide an improved vessel construction wherein decanted water is pumped from the vessel by the controlled descent of a pump therein until it reaches a predetermined level whereupon the collected, settled solids are removed by gravity through an exit port in the bottom of the vessel.

It is another object of this invention to provide a unique anti-vortex cap for the solids exit port from a water treatment vessel which will eliminate a vortex when the port is opened so that the accumulated solids will flow efficiently by gravity through the port in the bottom of the vessel with a minimum of already treated clear water.

It is yet another object of this invention to provide an anti-vortex cap in an exit port disposed at the low point of a flared hopper wherein the accumulated solids in the bottom of the hopper will flow both horizontally and vertically through the port without the formation of a vertically extending vortex.

These and other objects will become readily apparent with reference to the drawings and following description wherein:

BRIEF DESCRIPTION OF THE DRAWINGS

FIG. 1 is a schematic view of the batch sequential arrangement of an embodiment of a water treatment plant according to this invention.

FIG. 2 is a sludge drain schematic of the exit flow from a vessel of this invention.

FIG. 10 is a fragmentary plan view showing a single flared hopper.

FIG. 11 is a schematic plan view showing the anti-vortex cap for the drain in the hopper of FIG. 10.

FIG. 12 is a schematic plan view of an alternate embodiment square hopper design according to this invention.

FIG. 13b is a fragmentary cross-sectional view of the tank of FIG. 13a.

FIG. 14b is a fragmentary cross-sectional view of the tank of FIG. 14a.

DETAILED DESCRIPTION OF THE INVENTION

Figure 4:
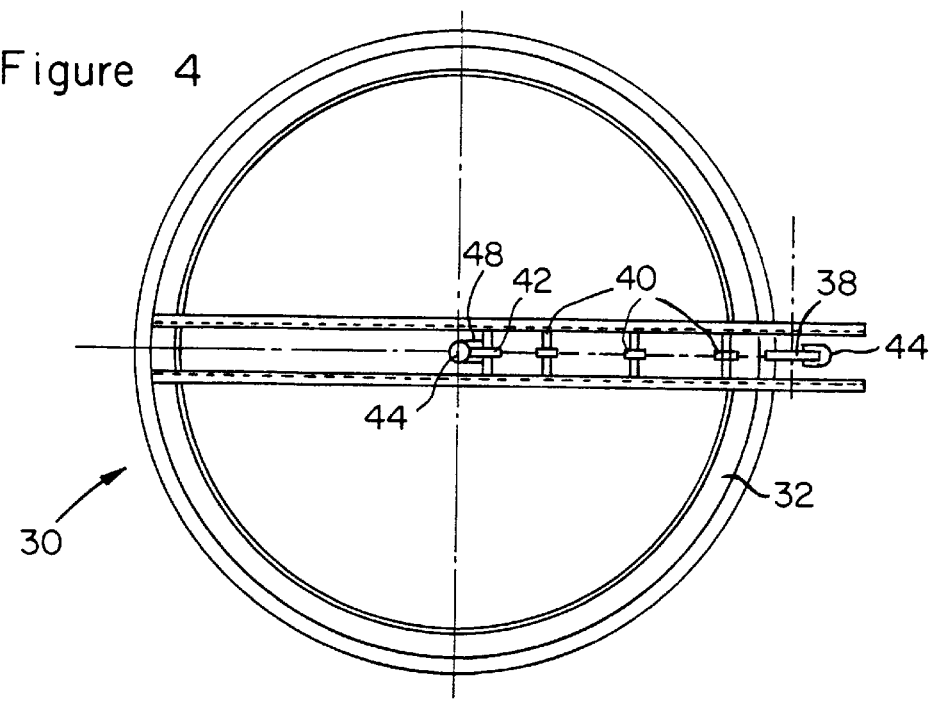
FIG. 4 is a plan view of the vessel of FIG. 3.

As described in my related patent application identified above and incorporated by reference herein, it is possible to combine the steps of adding and mixing chemicals and settling in a single vessel to eliminate conventional filters and settling tanks in a water treatment process. Multiples of such modules then can be operated in batch sequential fashion. The result is that modules can be added based upon precisely projected increases in plant capacity whereas in the case of conventional continuous flow plants the capacity over the life of the plant must be built in when the plant is constructed. Typically then if that capacity is under estimated, the plant will be at capacity before the expiration of its useful life. In such a situation, modules can be added as needed rather than initiating a major construction expansion of the existing plant which in turn would be based on only estimated capacity over the life of the plant. The modular construction then allows for efficient use of construction funds so that plant capacity is realistically related to the actual capacity needed.

In a preferred embodiment of the instant invention each module consists of a cluster of hoppers rather than a single hopper for settling of the solids in the effluent. In the upper portion of the modular tank adding chemicals, mixing chemicals and settling takes place. As will be subsequently explained, the hoppered bottom of the tank is intended to accumulate the solids either colloidally dispersed in the influent or the solids precipitated by chemical additives, flocculating agents and the like. Because the slope of the sides of such a hopper, as is conventionally known, depends upon engineering factors related to efficient utilization of space, it has been discovered that a cluster of such hoppers in a single vessel is a more efficient use of construction space than a single hopper vessel in that the cluster of hoppers allows a reduction in the size of the overall settling zone. This, however, requires that the settled solids be discharged at an equal mass flow rate from the hoppers in a cluster. For example, if when drain valves are opened, one of multiple hoppers empties at a faster rate, there will be a disturbance at the surface of the settled solids which will tend to put such solids back into dispersion.

Furthermore, it is necessary to decant the accumulated liquid from the top of the settling zone also without disturbing the settled solids. This decantation process should be rapid and efficient so that the vessel can be quickly emptied for reuse. Once the solids therein have settled, liquid and solids are separately removed from the vessel as rapidly as possible so that the module can be placed on line again.

With attention to FIG. 1, there is depicted a plan view of a series of three modules or vessels 10 which are identical and are intended to be used in a water treatment process by batch sequential operation.

Each vessel 10 treats a fixed quantity of liquid from a first stage of adding chemicals to a last stage of removing accumulated solids from the hopper bottom. When pump 12 is activated, liquid is supplied through conduit 14 to the automatic feed valves 16 for each module 10. For the purpose of description herein the modules are labeled sequentially A, B and C. Associated structural features then will be identified here and after by their common reference number and vessel letter identification.

Automatic feed valve 16 of module A then emits liquid to vessel 10, module A, until the influent is at a predetermined level whereupon the valve automatically closes and automatic feed valve 16 of module B opens. The process is then repeated until all vessels 10 are filled whereupon all feed valves will be closed. A chemical feeder 18 and blower 20 are energized. Blower 20 supplies air to mix chemicals with the liquid in each vessel 10 to complete coagulation and flocculation. The chemical feeder 18 will continue to be energized in each vessel until the prescribed quantity of chemicals has been injected into the liquid. The blower will continue to be energized to supply air to the vessels until the flocculation stage has finished. As will be obvious to those skilled in the art, both can be automatically controlled at each vessel 10 so that, for example, while a common blower 20 is shown schematically, the air input at each vessel 10 is strictly controlled and may be automatically controlled.

When flocculation is complete the liquid should have no further disturbances applied to it so that it starts the settling stage. When the settling stage is completed a decant assembly, the motor for which is shown at reference number 22 is initiated at each vessel 10 using the decant apparatus of this invention as will be subsequently described. The liquid in the tank is then decanted without disturbing the solids as also will be subsequently described in detail.

When the liquid has been decanted to a predetermined level in each vessel 10, an automatic dump valve 24 is opened at each vessel. FIG. 2 is a schematic of the sludge flow plan from a single vessel 10 having four hoppers with outlets 26 as shown.

When the accumulated solids are removed the dump valve 24 closes and the process for the particular vessel is finished. At this point, the vessel can be placed back online and influent directed thereinto to repeat the process. Each vessel 10 is treated sequentially as described above.

Figure 3:
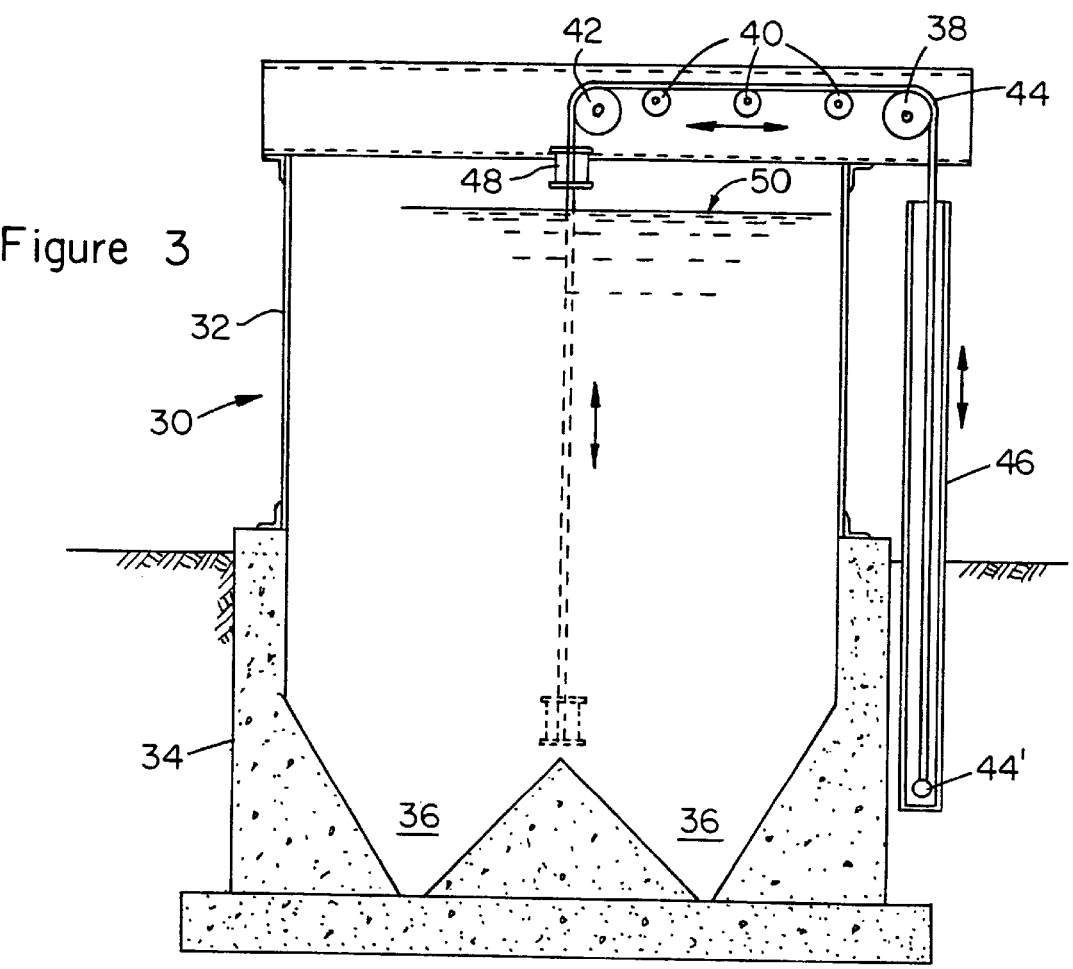
FIG. 3 is a side view of a schematic representation of a multi-hoppered water treatment vessel of this invention.

FIGS. 3 and 4 illustrate the decant assembly of this invention in a four hoppered cylindrical module 30. Module 30 has cylindrical walls 32 which are supported by a base 34 and which forms hoppers 36. The drain mechanism for hoppers 36 is not shown in FIGS. 3 and 4 but will be described separately. With attention to FIG. 1, the motor 22 drives a sprocket wheel 38. Followers 40 are provided along with a support wheel 42, all of which support a flexible conduit 44 which extends from a pipe 46 to the pump 48.

In FIG. 3, the decant mechanism is shown with the pump 48 in the raised position, the module 30 has a liquid level 50, and the flexible conduit 44 and pump 48 are also shown in phantom with pump 48 in the lower most position within module 30, adjacent hoppers 36. As the drive wheel 38, which may be a sprocket wheel or similar device, rotates, the pump 48 lowers, and the conduit end 44' rises within pipe 46. Liquid as it is pumped from module 30 through conduit 44 causes the surface line 50 to drop and as will be obvious to those skilled in the art, a conventional drive system for the motor 22 can be utilized so that pump 48 which is normally submerged below liquid line 50 remains submerged until it reaches the position shown in phantom in FIG. 3. At the low point, the motor driving the pump is turned off, and the motor driving wheel 38 is reversed. Liquid pumped from module 30 into pipe 46 is then carried away by a conduit system (not shown). In this way, the liquid can be decanted from the conduit 30 in a controlled rapid fashion whereby the liquid is removed without creating a vortex or other disturbance within the tank until the liquid level 50 has lowered to a point adjacent to the settled solids so that sufficient liquid remains within module 30 to carry solids from the hopper 36 as will be subsequently described.

Figure 5:
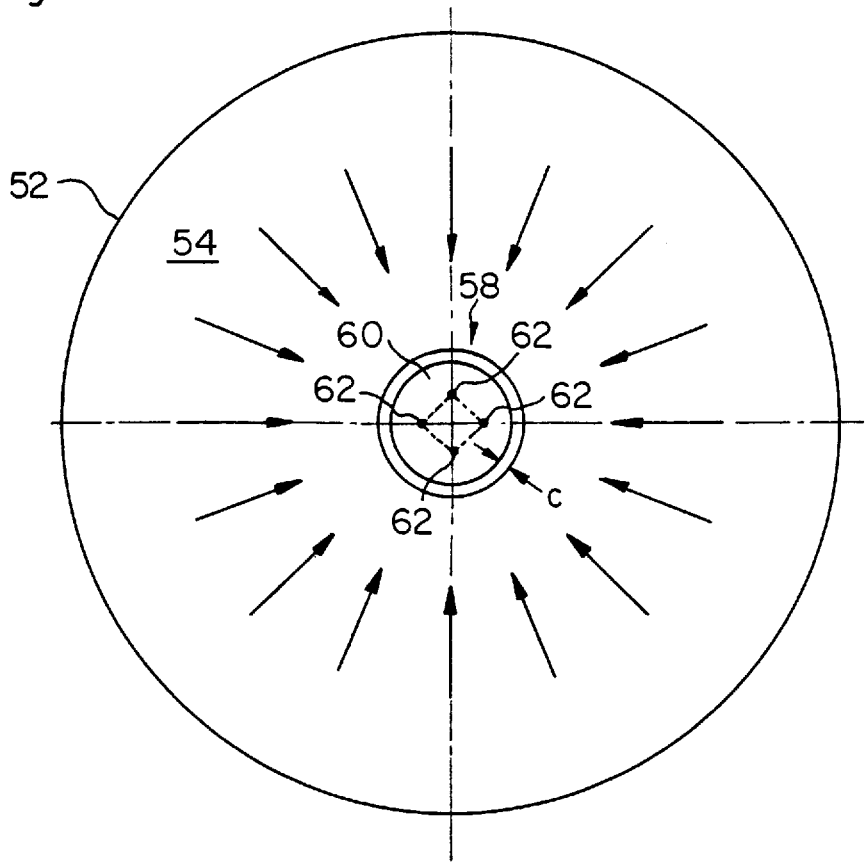
FIG. 5 is a schematic plan view of a single conical hopper vessel of this invention.
Figure 6:
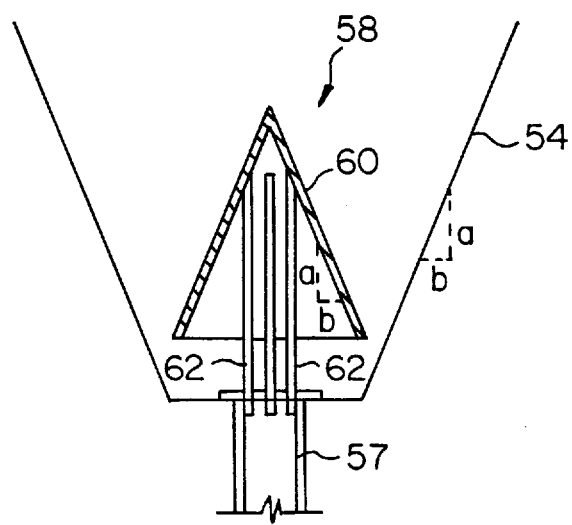
FIG. 6 is a fragmentary cross-sectional schematic view of the exit port of a single hopper vessel of this invention showing the anti-vortex cap.

Concerning the discharge of the solids from the module of this invention, FIG. 5 is a plan view of a conical hopper 52 of a module of this invention having sides 54 which slope at a predetermined angle to a bottom outlet or drain 56 shown in FIG. 6. The anti-vortex cap of this invention consists of a downwardly opening cap 58 which has sides 60 which slope at the same angle, but negative of the slope as the sides 54 of the hopper 52. It should be noted that in the example of FIGS. 5 and 6 the hopper is conical or frustro-conical, but if the hopper is not circular in cross-section the sides of the cap 60 would coincide with the sides of the hopper 52 as a mirror image with a negative slope identical thereto. This negative slope is depicted in FIG. 6 wherein the vertical distance a and the horizontal distance b for sides 54 and 60 are identical but distance b for side 60 is negative whereas distance b 54 is positive.

The cap 58 is supported preferable by four rods 62 which in turn are supported by the drain 56. It should be noted that there is a minimum distance between the lower extension of side 60 and the lower portion of side 54. This distance identified by the letter c in FIG. 5 can be varied as will be obvious to those skilled in the art based upon the particle flow rate desired therethrough. This distance is, in effect a governor for the flow through for the drain 56 to avoid cavitation or vortexing at the drain.

Figure 7:
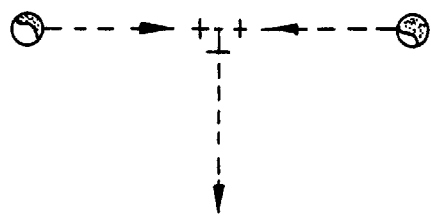
FIG. 7 is a layout plan of the exit flow from a pair of hoppers according to this invention.
Figure 8:
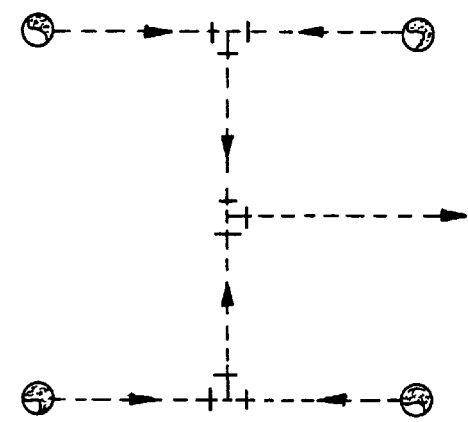
FIG. 8 is a view similar to FIG. 7 showing the exit flow from a four hopper cluster.
Figure 9:
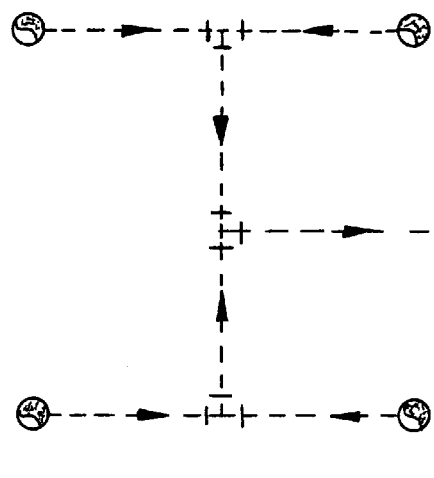
FIG. 9 is a view similar to FIGS. 7 and 8 of the exit flow from an eight hopper cluster of this invention.
Figure 9:
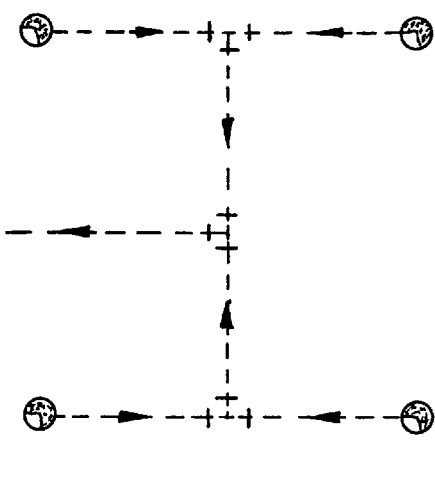
Figure 13A:
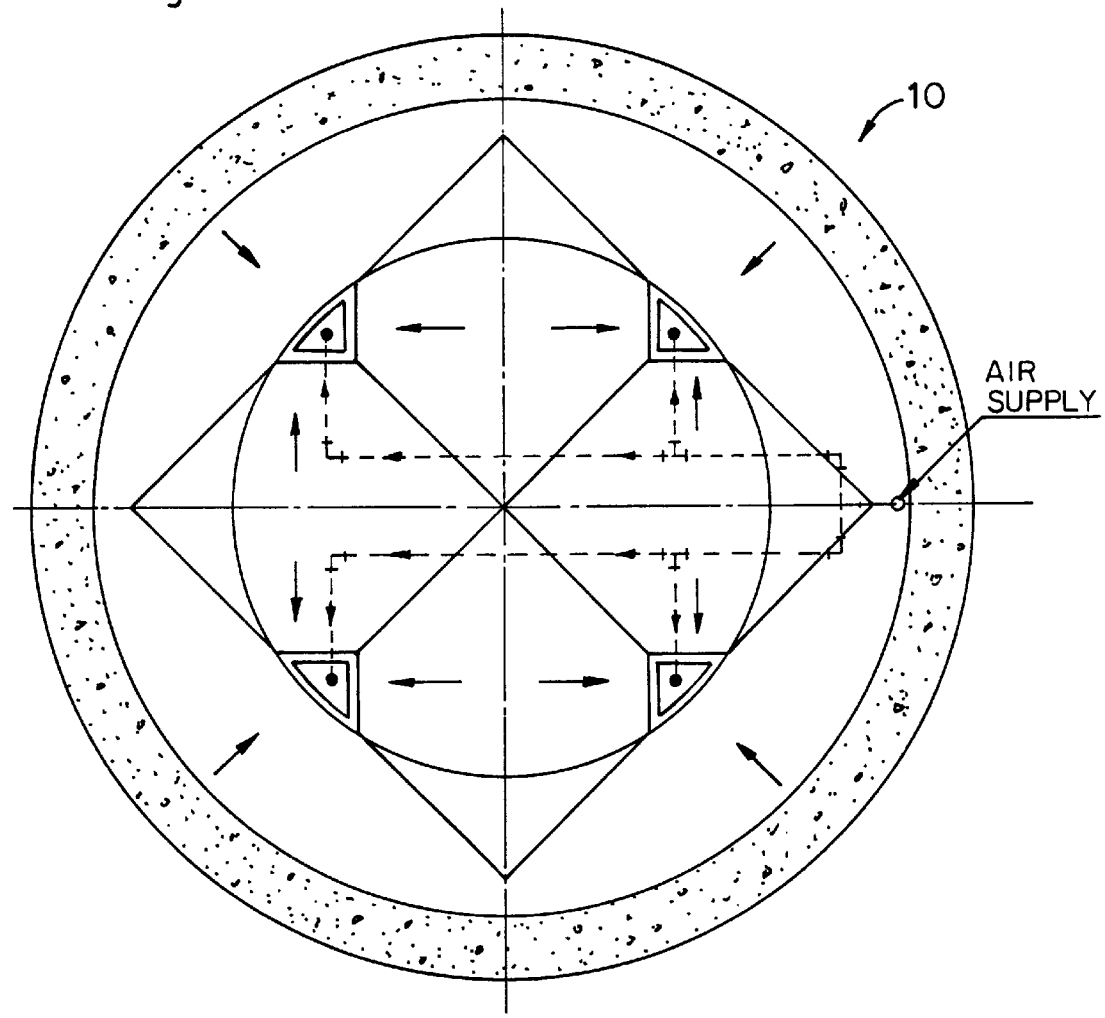
FIG. 13a is a plan view of the tank embodiment of FIG. 1.
Figure 13B:
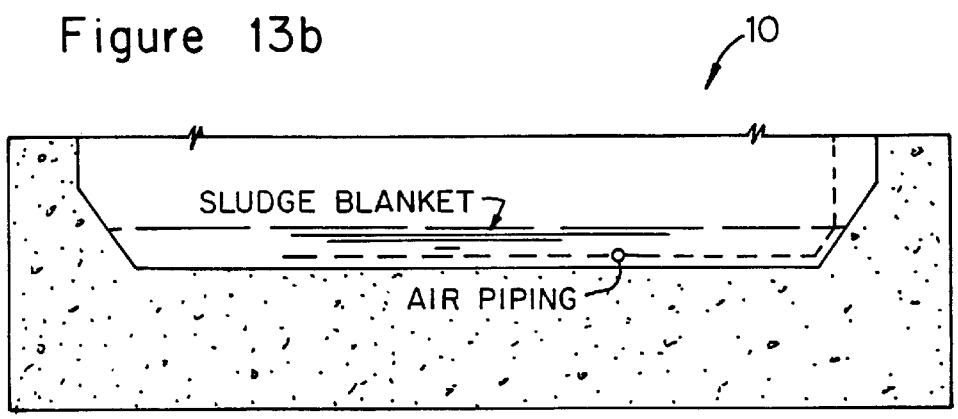
Figure 14A:
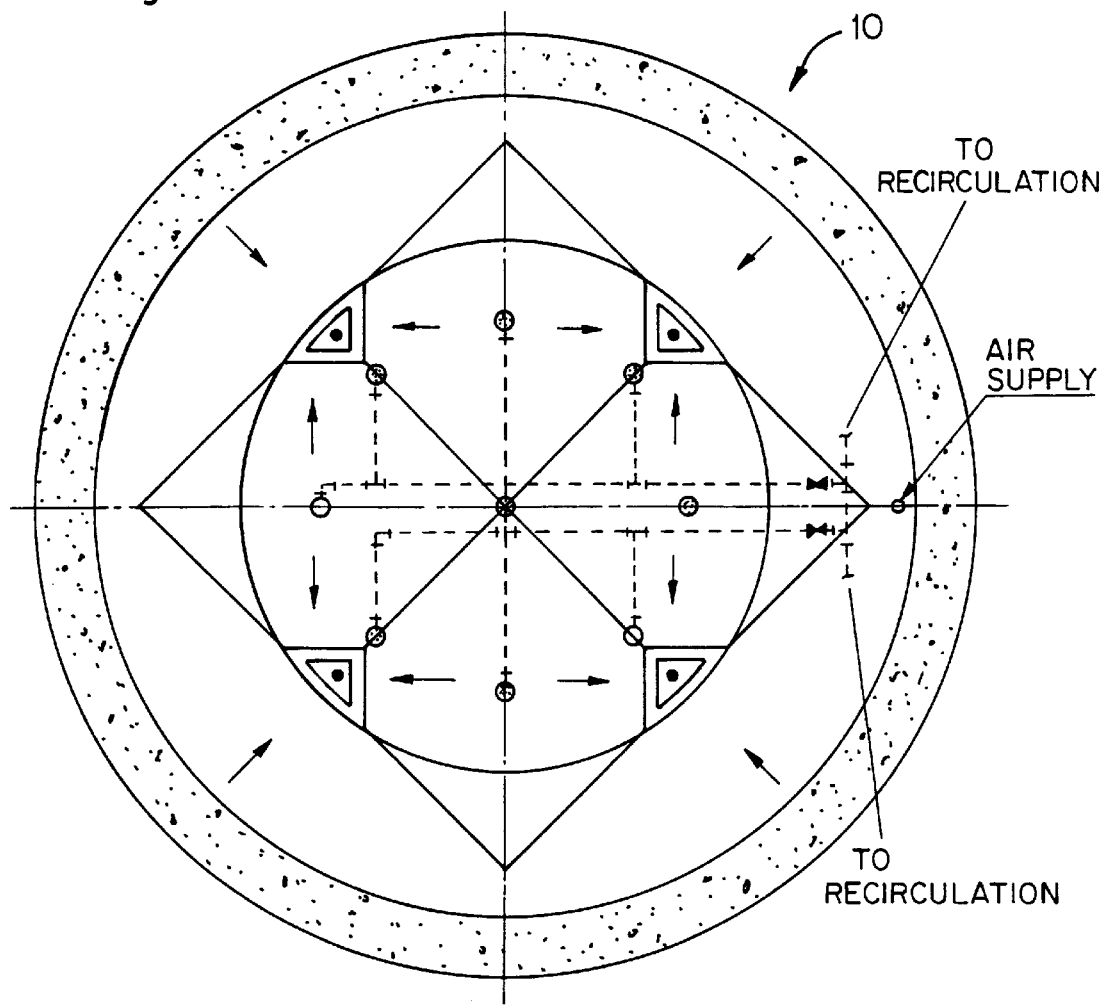
FIG. 14a is a plan view of the tank embodiment of FIG. 1.
Figure 14B:
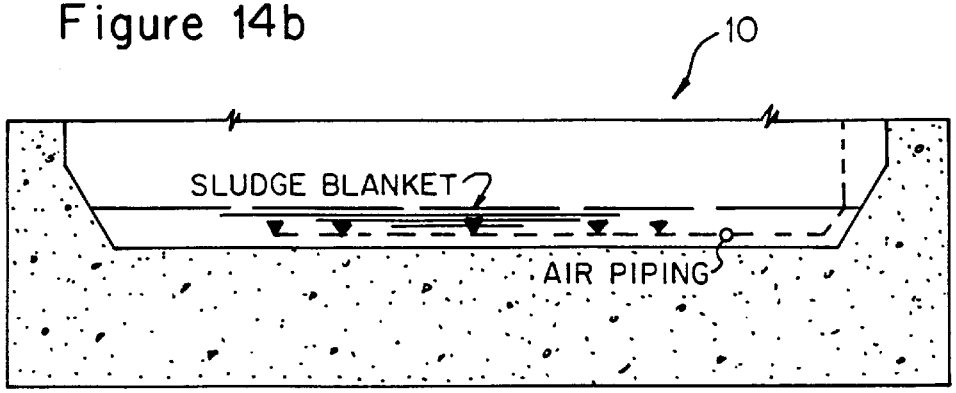

Concerning the structure of the hopper cluster for the module of this invention, and with reference again to FIG. 3, for example, as previously indicated, multiple hoppers in a single vessel are most desirable from an efficiency stand point. This is necessary so long as the flow rate from each hopper drain is identical and depends only then on the fluid friction within the drain conduits. In other words, each hopper in a cluster should drain in the same mass flow rate. FIG. 7 illustrates a drain scheme for a cluster of two hoppers, FIG. 8 illustrates a drain scheme for a cluster of four hopper and FIG. 9 illustrates a drain scheme for a cluster of 8 hoppers. Because the intended drain piping becomes extremely complicated as the number of hoppers increases, in the preferred embodiment of this invention four hoppers are used according to FIG. 8 within a single modular vessel.

FIG. 10 illustrates a single hopper 70 within a vessel 72 which occupies a quadrant thereof. The vessel 70 has sides 72 which slope downwardly as shown by the arrow therein to the cap 74 of this invention at the bottom thereof, which is supported by vertical posts 76 as described above relative to FIG. 6. As shown in FIG. 11 the cap 74 has sides 76, 76' and 76" which are sloped to conform to the sides 72, 72' and 72" of hopper 70.

Similarly, FIG. 12 shows another embodiment wherein the hopper 70 is squared and has sides 82 which slope downwardly to a anti-vortex cap 84 of this invention which is similarlysloped at a negative angle from an apex 86 downwardly as shown. As in the other embodiments the vortex cap 84 is supported by vertical rods 88 which extend upwardly from the drain (not shown) located therebelow.

In summary then, in order to facilitate batch sequential operation in a treatment plant module wherein the adding of chemicals, mixing of chemicals and settling phases are combined in a single modular vessel, elimination of the filters and settling tanks from conventional facilities used to separate the solids from the liquid can be achieved by using the decant system of the instant invention. Specifically, at the completion of the settling phase, a pump is lowered by a motor driven flexible conduit until it is submerged within the liquid at the upper portion of the vessel. The pump then operates to decant the liquid and at the same time the pump is lowered therein so that it remains submerged during the entire decantation process. At the end of the decantation process when the pump is suspended a predetermined distance within the tank, the pump is shut-off, and raised out of the tank. The solids are then removed from hoppers within the tank by opening a drain valve so that all hoppers within a specific module drain simultaneously and drain by gravity. In order to facilitate the gravity drainage, an anti-vortex cap is provided over the drain of each tank. The cap specifically is an upwardly extending member having sides conforming to the sides of the hopper but at a negative angle of slope thereto. The lower extension of the cap then is spaced a minimum distance from the hopper side and this acts as a governor for the flow of sludge or settled solids into the drain. It has been discovered that this cap design facilitates drainage without creating a vortex so that the horizontal movement of the sludge within the hopper is facilitated along with vertical movement.

With these improvements, modular components for batch sequential operation of a water treatment plant can be used as a substitute for the filters and settling tanks of conventional continuous operation plants.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

I claim:

1. In a system for separating liquids from solids entrained therein by permitting solids to settle and decanting the liquid therefrom, including a vessel having an inlet and adding chemicals and mixing chemicals sections in the upper portion thereof, and a settling section and at least one drain in the lower portion wherein solids to be separated accumulate under the liquid to be decanted, the improvement comprising: a liquid, submersible pump having an inlet and an outlet, vertically, movably mounted within said vessel between a raised position in the upper portion and a lowered position in the lower portion of said vessel, a conduit means coupled to said pump, suspending said pump within said vessel, for decanting clear water from the chamber without disturbing settled solids; reel means coupled between said vessel and conduit means for raising and lowering said pump within said vessel whereby said pump remains submerged in the liquid as it is pumped from the vessel until a predetermined quantity remains in said vessel for discharge with the settled solids through the drain.

2. The vessel of claim 1 wherein said conduit means includes a flexible conduit having an inlet normally disposed within said vessel and coupled to an outlet on said pump and an outlet emptying outside said vessel.

3. The vessel of claim 2 wherein said reel means include a drive wheel train coupled to said conduit and mounted outside said vessel, said train comprising of at least one drive wheel and a plurality of follower wheels extending from a side of said vessel to the inlet thereof.

4. In the vessel of claim 1 the improvement further comprising: anti-vortex means disposed in said vessel over the drain for regulating the flow of solids therethrough to maximize horizontal movement in said settling section as solids flow vertically downward by gravity flow through said drain when said drain is open.

5. The improvement of claim 4 wherein said anti-vortex means comprises a cap mounted over said drain and said settling section includes at least one hopper having sides sloping downwardly to a drain whereby the horizontal distance between opposite sides of said hopper decreases to a minimum adjacent said drain.

6. The improvement of claim 5 wherein said cap has a maximum dimension between opposite sides adjacent the drain.

7. The improvement of claim 6 wherein horizontal distance between said cap and hopper sides adjacent said drain is a predetermined minimum permitting discharge of liquid and settled solids through said drain without creating a vortex therein.

8. The improvement of claim 7 wherein the configuration of the sides of said cap is the same as the sides of said hopper.

9. The improvement of claim 8 wherein the slope of the sides of said hopper is the same as the slope of the sides of said cap except the angle of the latter is negative relative to that of the former.

10. The improvement of claim 5 wherein the settling section of said vessel includes a plurality of hoppers each hopper having its own drain and anti-vortex means.

11. The improvement of claim 10 wherein four hoppers are provided in said vessel.

12. The improvement of claim 5 wherein the sides of said hopper define a circle in horizontal cross-section.

13. The improvement of claim 5 wherein the sides of said hopper define a rectangle in horizontal cross-section.

14. The improvement of claim 11 wherein the outer sides of each hopper defines a 90° segment of a circle in horizontal cross-section.

15. The improvement of claim 9 wherein said hopper has a plurality of sides and at least two have different slopes and the slope of each hopper side and each adjacent cap side is the same.

* * * * *